US011859979B2

(12) United States Patent
Russell et al.

(10) Patent No.: US 11,859,979 B2
(45) Date of Patent: Jan. 2, 2024

(54) DELTA POSITION AND DELTA ATTITUDE AIDING OF INERTIAL NAVIGATION SYSTEM

(71) Applicant: Honeywell International Inc., Morris Plains, NJ (US)

(72) Inventors: Richard S Russell, Roseville, MN (US); Ctibor Mazal, Brno (CZ); Andrew Stewart, Chanhassen, MN (US); Vijay Venkataraman, Excelsior, MN (US)

(73) Assignee: Honeywell International Inc., Charlotte, NC (US)

( * ) Notice: Subject to any disclaimer, the term of this patent is extended or adjusted under 35 U.S.C. 154(b) by 444 days.

(21) Appl. No.: 16/796,822

(22) Filed: Feb. 20, 2020

(65) Prior Publication Data

US 2023/0304801 A1    Sep. 28, 2023

(51) Int. Cl.
*G01C 21/16* (2006.01)
*G01C 21/00* (2006.01)
(Continued)

(52) U.S. Cl.
CPC ......... *G01C 21/165* (2013.01); *G01C 21/005* (2013.01); *G01S 19/47* (2013.01); *G01S 19/49* (2013.01)

(58) Field of Classification Search
CPC ..... G01C 21/165; G01C 21/005; G01S 19/47; G01S 19/49
See application file for complete search history.

(56) References Cited

U.S. PATENT DOCUMENTS

| 7,193,559 B2 | 3/2007 | Ford et al. |
| 7,502,688 B2 | 3/2009 | Hirokawa |

(Continued)

FOREIGN PATENT DOCUMENTS

| CN | 109029433 A | 12/2018 |
| KR | 101192825 B1 | 10/2012 |

(Continued)

OTHER PUBLICATIONS

Autonomous Vehicle International, "Are you the missing piece?", The International Review of Autonomous Vehicle Technologies: From Conception to Manufacture to Implementation, Oct. 2019, pp. 1-3.

(Continued)

*Primary Examiner* — Anne Marie Antonucci
*Assistant Examiner* — Jared C Bean
(74) *Attorney, Agent, or Firm* — Fogg & Powers LLC

(57) ABSTRACT

Systems and methods for the external aiding of inertial navigation systems are described herein. In certain embodiments, a device includes an inertial navigation system. In some embodiments, the inertial navigation system includes one or more inertial sensors and an input interface for receiving measurements. In further embodiments, the measurements include at least one of delta attitude and/or delta position measurements from an external system, and position and attitude information in an arbitrary map frame. In certain embodiments, the inertial navigation system includes a computation device that is configured to calibrate the errors from the one or more inertial sensors using the received measurements.

20 Claims, 5 Drawing Sheets

(51) Int. Cl.
  *G01S 19/49* (2010.01)
  *G01S 19/47* (2010.01)

(56) References Cited

U.S. PATENT DOCUMENTS

| | | | |
|---|---|---|---|
| 7,752,483 | B1 | 7/2010 | Muresan et al. |
| 7,778,111 | B2 | 8/2010 | Hawkinson et al. |
| 8,213,706 | B2 | 7/2012 | Krishnaswamy et al. |
| 8,340,852 | B2 | 12/2012 | Bageshwar et al. |
| 8,744,763 | B2 | 6/2014 | Hawkinson et al. |
| 9,008,998 | B2 | 4/2015 | Canter |
| 9,031,782 | B1 | 5/2015 | Lemay et al. |
| 9,766,074 | B2 | 9/2017 | Roumeliotis et al. |
| 9,996,941 | B2 | 6/2018 | Roumeliotis et al. |
| 10,012,504 | B2 | 7/2018 | Roumeliotis et al. |
| 10,151,588 | B1 | 12/2018 | Singh et al. |
| 10,254,118 | B2 | 4/2019 | Roumeliotis et al. |
| 10,317,214 | B2 | 6/2019 | Fourie et al. |
| 2007/0244640 | A1 | 10/2007 | Hirokawa |
| 2009/0005986 | A1 | 1/2009 | Soehren |
| 2014/0300732 | A1 | 10/2014 | Friend et al. |
| 2015/0323672 | A1 | 11/2015 | Shenkar et al. |
| 2016/0140729 | A1 | 5/2016 | Soatto et al. |
| 2016/0189348 | A1 | 6/2016 | Canter |
| 2017/0343356 | A1 | 11/2017 | Roumeliotis et al. |
| 2018/0266828 | A1 * | 9/2018 | Best .................. G01C 21/1656 |
| 2019/0049566 | A1 | 2/2019 | Adams et al. |
| 2019/0163198 | A1 | 5/2019 | Niesen |

FOREIGN PATENT DOCUMENTS

| | | | | |
|---|---|---|---|---|
| WO | WO-2012167367 | A1 * | 12/2012 | ............ G01C 21/20 |
| WO | 2013080183 | A1 | 6/2013 | |
| WO | 2019156800 | A1 | 8/2019 | |

OTHER PUBLICATIONS

Chen et al., "Object Modeling by Registration of Multiple Range Images", Proceedings of the 1991 IEEE International Conference on Robotics and Automation, Apr. 1991, pp. 2724-2729, IEEE.
Engel et al., "Direct Sparse Odometry", IEEE Transactions on Pattern and Analysis and Machine Intelligence, Apr. 2017, pp. 1-14, IEEE.
Engel et al., "LSD-SLAM: Large-Scale Direct Monocular SLAM", Computer Vision ECCV, 2014, pp. 834-849, European Conference on Computer Vision.
Forster et al., "SVO: Fast Semi-Direct Monocular Visual Odometry", IEEE International Conference on Robotics and Automation (ICRA), 2014, pp. 1-8, IEEE.
Fraundorfer et al., "Visual Odometry: Part II—Matching, Robustness, and Applications", Zurich Open Repository and Archive, 2012, pp. 1-12, University of Zurich.
Gao et al., "INS/GPS/LiDAR Integrated Navigation System for Urban and Indoor Environments Using Hybrid Scan Matching Algorithm", Sensors 15, Sep. 2015, pp. 23286-23302, www.mdpi.com/journal/sensors.
Github, "Driver for SBG System Ellipse IMU", at least as early as Dec. 23, 19, pp. 1-3, GitHub, https://github.com/SBG-Systems/sbg_ros_driver.
Hawkinson et al., "GLANSER: Geospatial Location, Accountability, and Navigation System For Emergency Responders—System Concept and Performance Assessment", Proceedings of IEEE/ION PLANS, Apr. 2012, pp. 98-105, IEEE.
Julier et al., "A Non-divergent Estimation Algorithm in the Presence of Unknown Correlations", Jan. 25, 2008, pp. 1-5.
Julier et al., "General Decentralized Data Fusion with Covariance Intersection (CI)", 2001, pp. 1-25, CRC Press LLC.
Kastrenakes, "Google's Project Tango is shutting down because ARCore is already here", The Verge, Dec. 15, 2017, pp. 1-2.
Kit, "Visual Odometry / SLAM Evaluation 2012", The KITTI Vision Benchmark Suite, 2012, pp. 1-7, Karlsruhe Institute of Technology, http://www.cvlibs.net/datasets/kitti/eval_odometry.php.
Mohamed et al., "A Survey on Odometry for Autonomous Navigation Systems", Digital Object Identifier, U.S. Appl. No. 08/062,019, pp. 97466-97486, IEEE Access.
Mur-Artal et al., "ORB-SLAM: a Versatile and Accurate Monocular SLAM System", IEEE Transactions on Robotics, Sep. 18, 2015, pp. 1-18, IEEE.
Robertson, "Google Arcore Gives Android Users Augmented Reality Without Tango", Aug. 29, 2017, pp. 1-11, The Verge.
Scaramuzza et al., "Visual Odometry Part I: The First 30 Years and Fundamentals—Tutorial", IEEE Robotics & Automation Magazine, Dec. 2011, pp. 80-92.
Scherzinger et al., "Applanix IN-Fusion TM Technology Explained", at least as early as Sep. 18, 2007, pp. 1-4.
Velodyne, "LiDAR Puck VLP-16 Datasheet 63-9229 Rev-H", 2018, pp. 1-2, Velodyne LiDAR, Inc.
Wikipedia, "Iterative closest point", page last edited Dec. 2, 2019, pp. 1-3, Wikipedia.
Zhang et al., "LOAM: Lidar Odometry and Mapping in Real-Time", 2014, pp. 1-9.
Zhang et al., "Visual-lidar Odometry and Mapping: Low-drift, Robust, and Fast", IEEE International Conference on Robotics and Automation (ICRA), May 2015, pp. 1-8, IEEE.
Sirtkaya et al., "Loosely Coupled Kalman Filtering for Fusion of Visual Odometry and Inertial Navigation", 16th International Conference on Information Fusion, Jul. 2013, pp. 219-226, ISIF.

* cited by examiner

DELTA POSITION AND DELTA ATTITUDE AIDING OF INERTIAL NAVIGATION SYSTEM

BACKGROUND

Navigational information is used in many different applications. Depending on the application, various levels of accuracy and dependability may be desired. For some navigational applications, where high accuracy, redundancy, and other measures of high quality are desired, navigational systems may use inertial navigation systems that allow for higher rate, position, velocity, and attitude data. Further, measurements provided by an inertial navigation system may be fused with measurements provided through a global navigation satellite system (GNSS) receiver to further improve the quality of the measurements provided by the inertial navigation system.

Additionally, navigation information for an object may be acquired by sensing the environment of an object and changes in the position and attitude of the object with respect to visible features within the environment. For example, sensors, such as cameras, lidars, and the like may acquire information describing various observable aspects of the features within the environment. Using information describing the visible features within the environment, additional navigation parameters may be calculated.

SUMMARY

Systems and methods for the external aiding of inertial navigation systems are described herein. In certain embodiments, a device includes an inertial navigation system. In some embodiments, the inertial navigation system includes one or more inertial sensors and an input interface for receiving measurements. In further embodiments, the measurements include at least one of delta attitude and/or delta position measurements from an external system, and position and attitude information in an arbitrary map frame. In certain embodiments, the inertial navigation system includes a computation device that is configured to calibrate the errors from the one or more inertial sensors using the received measurements.

DRAWINGS

Understanding that the drawings depict only some embodiments and are not therefore to be considered limiting in scope, the exemplary embodiments will be described with additional specificity and detail using the accompanying drawings, in which.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

Systems and methods for providing external aiding of inertial navigation systems are provided herein. Some navigation systems may include processors that receive information from cameras, lidars, or other sensors (referred to hereafter as imaging sensors) that sense observable features within the environment of an object associated with the navigation system. The processors may use the observed environmental information to perform visual odometry, lidar odometry, point cloud registration, simultaneous localization and mapping (SLAM) or other algorithms that acquire navigation information from the information provided by the imaging sensors. The acquisition of navigation information from the observed environmental information may be a computationally intensive task that is beyond the capability of processors found within inertial navigation systems (INS). Accordingly, an imaging processing device typically acquires the observed environmental information from the imaging sensors and additional navigation information from an INS to calculate a reliable navigation solution.

In a typical operational scenario, the INS outputs raw inertial data, position, velocity and attitude which a coupled device accepts as input. A map building function in an application executing on a coupled device may use the raw inertial data to perform odometry and register the new point clouds to a map. However, in certain scenarios, GNSS signals may become obstructed, leading to a decrease in the accuracy of the data provided by the INS to the coupled device. Usually, though, environments that obscure GNSS signals are feature rich. Accordingly, the performance of odometry and other imaging techniques will have much slower position error growth rates than those experienced by the INS. Thus, the INS may have an interface for receiving information from the coupled device, wherein the INS uses the received information to reduce the error growth rate in GNSS denied environments or other situations that can benefit from the information provided by the coupled device.

Figure 1:
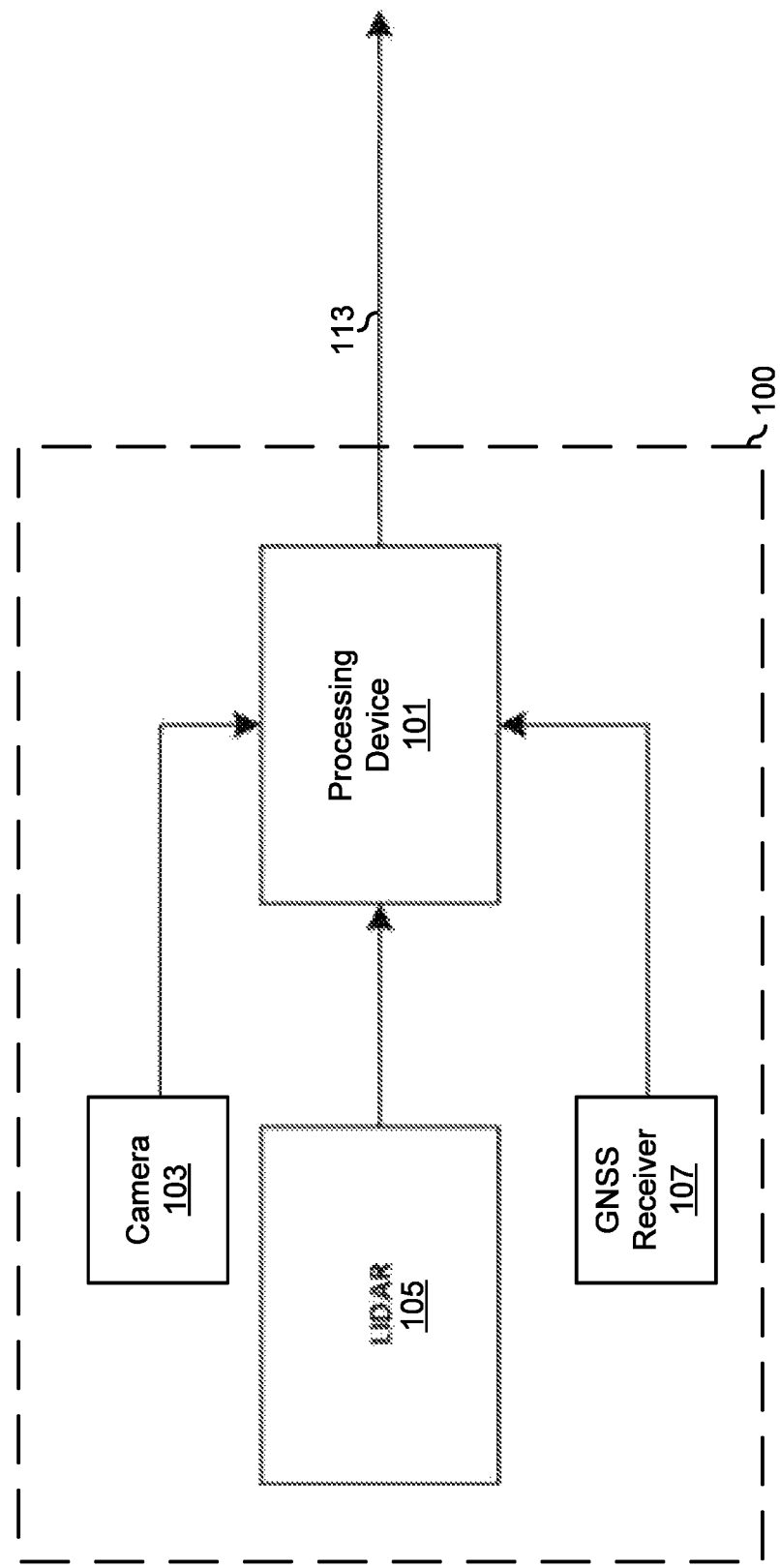
FIG. 1 is a block diagram illustrating a conventional navigation system using imaging sensors according to an aspect of the present disclosure.

FIG. 1 is a block diagram illustrating a conventional navigation system 100 that uses imaging sensors to acquire navigation information from an environment. As used herein, an imaging sensor may be any sensor capable of acquiring information from the environment through which an object (such as a vehicle, a personal electronic device, and other movable electronics) travels. In particular, an imaging sensor may acquire information from the environment through which a vehicle travels by detecting information reflected by objects within an observed field of view in the environment. For example, an imaging sensor may detect light, sound, electromagnetic radiation, and the like. In some implementations, an imaging sensor may emit signals towards objects in the environment through which the navigation system 100 travels and may detect portions of the signals that are reflected by surfaces in the environment. For example, an imaging sensor may be a camera 103 or a lidar 105. Additionally, the imaging sensor may be one or a combination of an electro-optical/infrared camera (EO/IR), radar, sonar, or other similar image capture system.

In some embodiments, an imaging sensor may include multiple imaging sensors. Further, the multiple imaging sensors may be the same type of sensors (i.e. multiple cameras) or implement multiple image sensing technologies. Additionally, the fields of view associated with each of the imaging sensors (camera 103 and/or lidar 105) may be non-overlapping, overlapping. or substantially identical. Depending on the sensor type, information acquired from multiple sensors having overlapping fields of view may be subsequently processed to acquire three-dimensional descriptions of objects in the observed environment.

When capturing information from the environment observed by the imaging sensors, the imaging sensors may capture multiple frames of image data describing the environment. Generally, a frame of image data contains information describing features within the observed environment. The information can be extracted and matched to similar information in other frames acquired at different times to determine the relative position and orientation of the imaging sensor and the attached navigation system 100 within the environment.

An image frame captured by the imaging sensors may be characterized by a two-dimensional grid of pixels, a three-dimension point cloud, statistical descriptors, other types of information that could capably describe objects within an environment for subsequent comparisons. For example, a feature within an image frame may be a collection of pixels or points that are distinguishable from the surrounding pixels. The features may be points having particular relationships to neighbors, planes, textures, statistical distributions, and the like. Generally, identified features described in the image frame correlate to objects in the environment. As discussed above, features found in multiple image frames may be tracked either by identifying the collections of pixels or points as the same objects, or by estimating the position of features using measurements from systems other than the imaging sensors.

The image frames captured by the imaging sensors may be analyzed by a processing device 101. As used herein, one or more computational devices, such as the processing device 101 or other processing unit, used in the system and methods described in the present disclosure may be implemented using software, firmware, hardware, circuitry, or any appropriate combination thereof. The one or more computational devices may be supplemented by, or incorporated in, specially-designed application-specific integrated circuits (ASICSs) or field programmable gate arrays (FPGAs). In some implementations, the one or more computational devices may communicate through an additional transceiver with other computing devices outside of the navigation system 100. The one or more computational devices can also include or function with software programs, firmware, or other computer readable instructions for carrying out various process tasks, calculations, and control functions used in the present methods and systems.

The present methods may be implemented by computer executable instructions, such as program modules or components, which are executed by the at least one computational device. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processing unit, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks or any other media that can be used to carry or store desired program code in the form of computer executable instructions or data structures.

The processing device 101 may be a processing device (such as the computational device described above with respect to FIG. 1). Upon receiving image frames of data from the imaging sensors, such as camera 103 and/or lidar 105, the processing device 101 may extract feature descriptors from the data provided by the imaging sensors. For example, extracted feature descriptors may include points that define planes, points, orientations of the various points and planes, statistical descriptions, histograms, image intensity, reflectivity of observed surfaces, and the like. Using the information acquired by the imaging sensors for multiple images acquired at different times, the processing device 101 may also execute feature matching algorithms for the features identified in the received image frames. The processing device 101 may calculate changes in relative orientation and relative translation with respect to the features based on differences between the feature descriptors in separate images for a matched feature.

The processing device 101 may use information that describes matched features in the frames of image data to generate odometry information. Additionally, the navigation system 100 may store information used and produced by the processing device 101 that describes the tracked features from multiple image frames acquired at different times by the imaging sensors. In some embodiments, a memory unit, in communication with or part of the functionality ascribed to the processing device 101 and/or imaging sensors, may store information describing extracted features from the image frames. As the imaging sensors capture sequential image frames, one or more features identified within an image frame may correspond to features identified in previously and/or subsequently acquired image frames.

In certain embodiments, the navigation system 100 may also include a GNSS receiver 107. The GNSS receiver 107 may include at least one antenna that receives satellite signals from GNSS satellites. A GNSS satellite, as used herein, may refer to a space satellite that is part of a global navigation satellite system that provides autonomous geospatial positioning with global coverage. Generally, a GNSS receiver 107 receives line-of-sight time signals from GNSS satellites and calculates a geo-spatial position based on the time signals received from multiple GNSS satellites. Examples of GNSS systems may include the Global Positioning System (GPS) maintained by the United States government, the Galileo system maintained by the European Union (EU) and European space agency (ESA), the BeiDou navigation system maintained by China, among other navigation systems maintained by various national governments and political entities.

In certain embodiments, the processing device 101 or other computational device may be coupled to the GNSS receiver 107 and may receive pseudorange measurements associated with the separate GNSS satellites within the line of sight of the GNSS receiver 107. When the processing device 101 receives measurements from four or more satellites, the processing device 101 may calculate location information for the navigation system 100 anywhere on or near the Earth. In particular, during operation, the GNSS receiver 107 may extract the position, velocity and time (PVT) from the signals received from visible GNSS satellites and provide the pseudorange measurements to the processing device 101. The computational device may derive PVT information for the navigation system 100.

In certain embodiments, the GNSS receiver 107 may provide pseudorange measurements or position information calculated therefrom to the processing device 101, the processing device 101 may fuse the relative position information based on measurements from the imaging sensors with the absolute position information acquired from the GNSS receiver 107 to provide a navigation output 113. The navigation output 113 may include an updated map, a georeferenced point cloud, notifications on obstacles to avoid, a planned path, and other useful navigation information. Because information is fused, when the navigation system 100 passes through GNSS denied environments, the navigation system 100 may use previously received GNSS measurements fused with previously received odometry information from the imaging sensors to provide current position estimates based on recently received information from the imaging sensors. Additionally, the processing device 101 may provide pseudorange corrections to adjust the pseudorange measurements from the GNSS receiver 107 based on calculated estimates from the processing device 101.

As illustrated in FIG. 1, the imaging sensors may include a lidar 105 and a camera 103. The lidar 105 and the camera 103, in conjunction with the processing device 101, may respectively perform lidar odometry and camera odometry. As used herein, the lidar 105 may be a sensor that uses a laser to measure distances to nearby objects. The measured distances provided by the lidar 105 may be used to perform odometry, high-fidelity 2D and 3D map making, vehicle state-estimation, real-time path planning and obstacle avoidance, among other navigation operations.

When performing lidar related operations, the navigation system 100 may perform a process referred to herein as "point set registration" or "point cloud registration." The lidar 105 may provide measurements as three dimensional points in relation to the navigation system 100. The lidar 105 or processing device 101 may group points or sets of points acquired from the same lidar scan into point cloud sets. Point cloud registration may be the process of determining how one point cloud set acquired from a lidar scan at a first time relates to another point cloud set subsequently acquired from another lidar scan at a second time. Specifically, the processing device 101 or lidar 105 may calculate a transformation that aligns the points in different point cloud sets.

In some embodiments, the performance of point cloud registration may include two steps. A first step in performing point cloud registration may begin by determining whether there are matching points in different sets and, if so, determining which points are the same between the different sets. A second step in performing point cloud registration may include estimating the transformation (rotation and translation) required to align the matching points. Point cloud registration may be a computationally intensive process and the number of points measured by the lidar 105 is proportional to the intensity of the computations performed by the processing device 101. Accordingly, efforts are made to reduce the computational burden while maintaining accuracy. For example, some efforts attempt to reduce the number of points which require matching between point cloud sets. Some efforts randomly reduce the number of points in the sets of points. Other efforts attempt to extract features like lines, planes, and surfaces in an attempt to reduce the number of points in a set from millions to hundreds or less.

In some embodiments, the use of a lidar 105 may provide advantages that include accurate range measurements, accurate odometry in position and attitude, widely available high-fidelity maps, not impacted by light conditions. However, the use of a lidar 105 may be subject to several disadvantages that may include computational intensity, large amounts of physical data storage, size, power consumption, cost, may lose track during fast rotations and translations, laser range is too short for some applications, and different point clouds must have matching features.

In similar embodiments, the navigation system 100 may perform visual odometry based on measurements acquired from the camera 103. As used herein, visual odometry may refer to the process of estimating the motion of an object (e.g., a vehicle, human, robot, and the like) using only the input of one or more cameras 103 attached to the object. The processing device 101 may analyze multiple images, acquired by the camera 103, to determine a transformation (translation, rotation and scale) between the images in a similar manner to processes performed with lidar odometry as described above. In other implementations, features may be extracted from the images and tracked over time. However, direct methods for acquiring navigation information also exist. For example, the measurements presented to the visual odometry algorithms may include pixel representations of identifiably unique features. A camera model stored in memory may be used to estimate a three dimensional location of the feature in the real world. The rotation and translation may then be solved for up to an unknown scale factor for translation. If the camera 103 includes two or more cameras that are separated from one another by a known distance, then the scale of the translation may be determined. Alternatively, if only a single camera is used, then the scale of the translation may be determined using information acquired from other sources of navigational information.

In some embodiments, the advantages of using one or more cameras 103 to perform visual odometry may include the relatively inexpensive cost of cameras, small size, lightweight, and the ability to provide data at fast rates. However, the use of cameras 103 to perform visual odometry is also subject to disadvantages that include the use of high quality cameras may be expensive, especially when multiple cameras are used to provide stereo images, thus requiring time synchronization between the images. Further disadvantages include camera calibration that may subsequently change with temperature and time changes, the use of additional information from other sensors to support monocular implementations, performance affected by the lighting of an environment, unable to track fast rotations and translations, and different images must have matching features to determine motion based on changes in the two images.

As illustrated, the navigation system 100 includes both a camera 103 and a lidar 105. The processing device 101 may use the measurements provided by the camera 103 and the lidar 105 to combine visual and lidar odometry thus improving the performance of both thereby. For example, the processing device 101 may perform a lidar odometry and mapping (LOAM) algorithm to combine the measurement from the camera 103 with the measurements from the lidar 105. Combinations of lidar odometry and visual odometry may provide benefits where there is aggressive motion and environments lacking visual features. For instance, when measurements from the camera 103 is unable to provide a state estimate, the lidar 105 may provide a state estimate and vice versa. While the combination of measurements from the lidar 105 and the camera 103 may address problems related to featureless environments, the processing device 101 may still lose track when the navigation system 100 experiences excessive motion.

Figure 2:
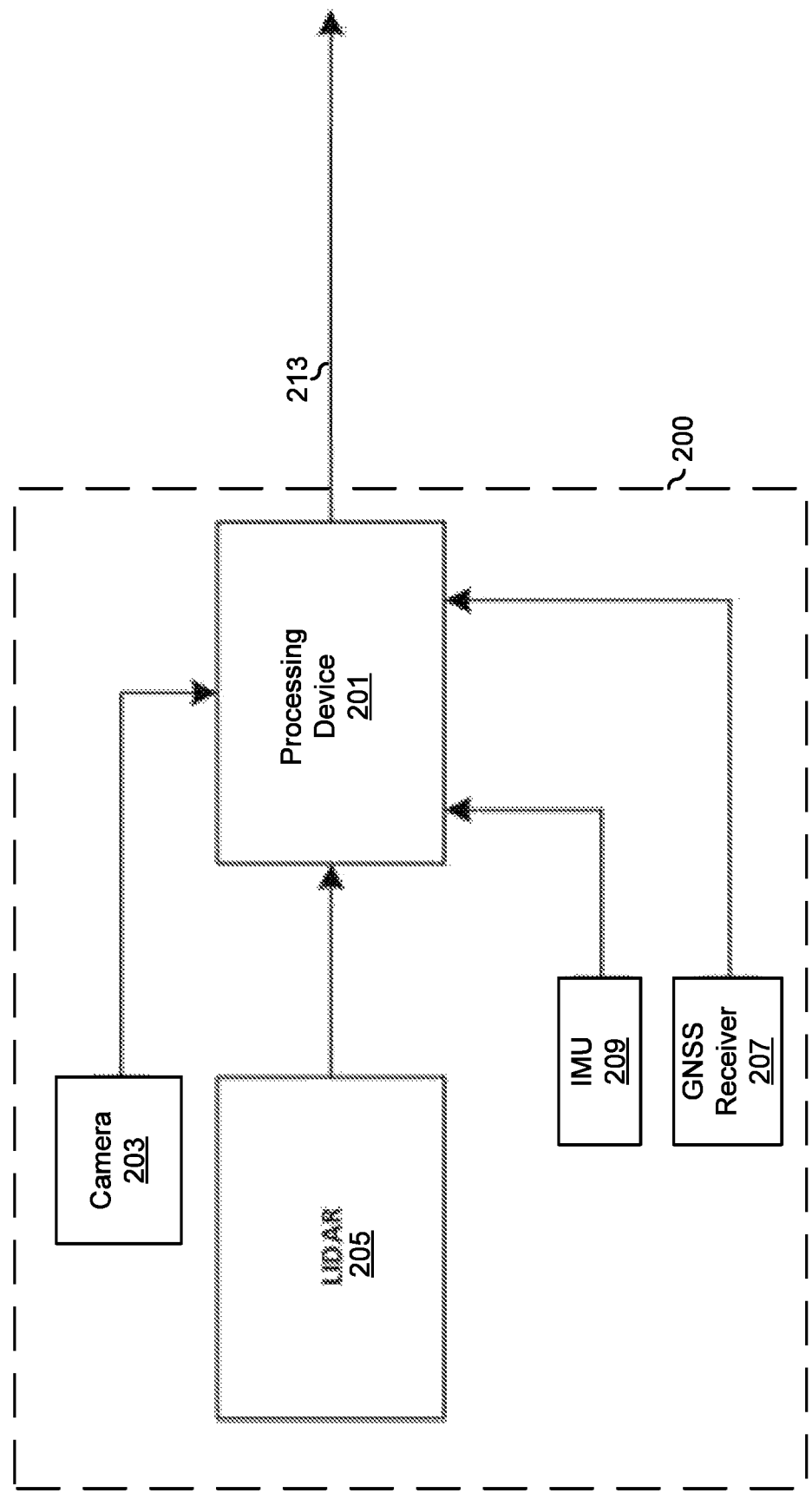
FIG. 2 is a block diagram illustrating a conventional navigation system with an integrated inertial measurement unit according to an aspect of the present disclosure.

In contrast to the system 100 in FIG. 1, an inertial measurement unit or inertial navigation system (INS) may be used to supplement the information acquired from the imaging sensors and the GNSS receiver 107. For example, FIG. 2 is a block diagram illustrating a conventional navigation system 200 with an integrated inertial measurement unit (IMU) 209. As illustrated, the navigation system 200 may include imaging sensors, such as a camera 203, a lidar 205, or other types of imaging sensors. Also, the navigation system 200 may include a processing device 201. The processing device 201 functions with the camera 203 and the lidar 205 to perform visual and lidar odometry in a similar manner to that described above with respect to the camera 103, the lidar 105, and the processing device 101 in FIG. 1. Additionally, the navigation system 200 may include a GNSS receiver 207, wherein the GNSS receiver 207 may provide pseudorange measurements for combining with the odometry calculations in a similar manner to the GNSS receiver 107 in FIG. 1.

As discussed above, the performance of visual odometry and lidar odometry is limited. In particular, performance may be limited when the navigation system 200 experiences aggressive motion, moves through a featureless environment, or both. To account for aggressive motion and featureless environments, the navigation system 200 may include additional sensors that can provide navigational measurements when the navigation system 200 experiences aggressive motion and/or travels through a featureless environment. For example, the navigation system 200 may include an IMU 209. As referred to herein, the IMU 209 may be a system that provides raw inertial measurements of the motion experienced by the navigation system 200. For example, the IMU 209 may include a series of gyroscopes, accelerometers, and/or magnetometers that measure the acceleration and rotation of the navigation system 200 along one or more axes. Using dead-reckoning, processing devices (such as processing device 201) may create a state estimate of the position, velocity, and attitude of the object tracked by the navigation system 200 and identify the location of the navigation system 200 on a map.

In some implementations, the processing device 201 may use the state estimates calculated from the inertial measurements provided by the IMU 209 to address the limitations of the lidar and visual odometry calculated as described above. Additionally, in some implementations, the imaging sensors and processing device 201 may form an odometry measuring system that is developed independently from the IMU 209, where the IMU 209 may provide the inertial measurements to odometry system. In such implementations, the applications executed by the processing device 201 may control how to use the provided inertial measurements when providing a navigation output 213. For example, applications executing on the processing device 201 may make simplifying assumptions based on the quality of the measurements provided by the IMU or based on the inertial measurements that are used to aid the odometry calculations. For example, an application executing on the processing device 201 that is associated with odometry calculations may neglect a Coriolis acceleration term in a velocity update equation and also neglect earth rate in an attitude update equation. Also, the application may control a data rate and coordinate system in which the angular velocity and linear acceleration are numerically integrated.

Using inertial measurements from an IMU 209 to aid the odometry calculation may improve the initial conditions used to execute point cloud registration functions. Also, the inertial measurements may help account for motion that occurs between image captures by the camera 203 and scans by the lidar 205. However, the use of the IMU 209 may also be subject to various disadvantages. For example, applications executing on the processing device 201 may consume computational resources to perform inertial navigation functions in combination with the performance of map-making, autonomous vehicle operations and/or other application purposes. Further, the processing device 201 produces a single navigation solution through the navigation output 213. Thus, redundancy and quality checks may be difficult to perform.

Figure 3:
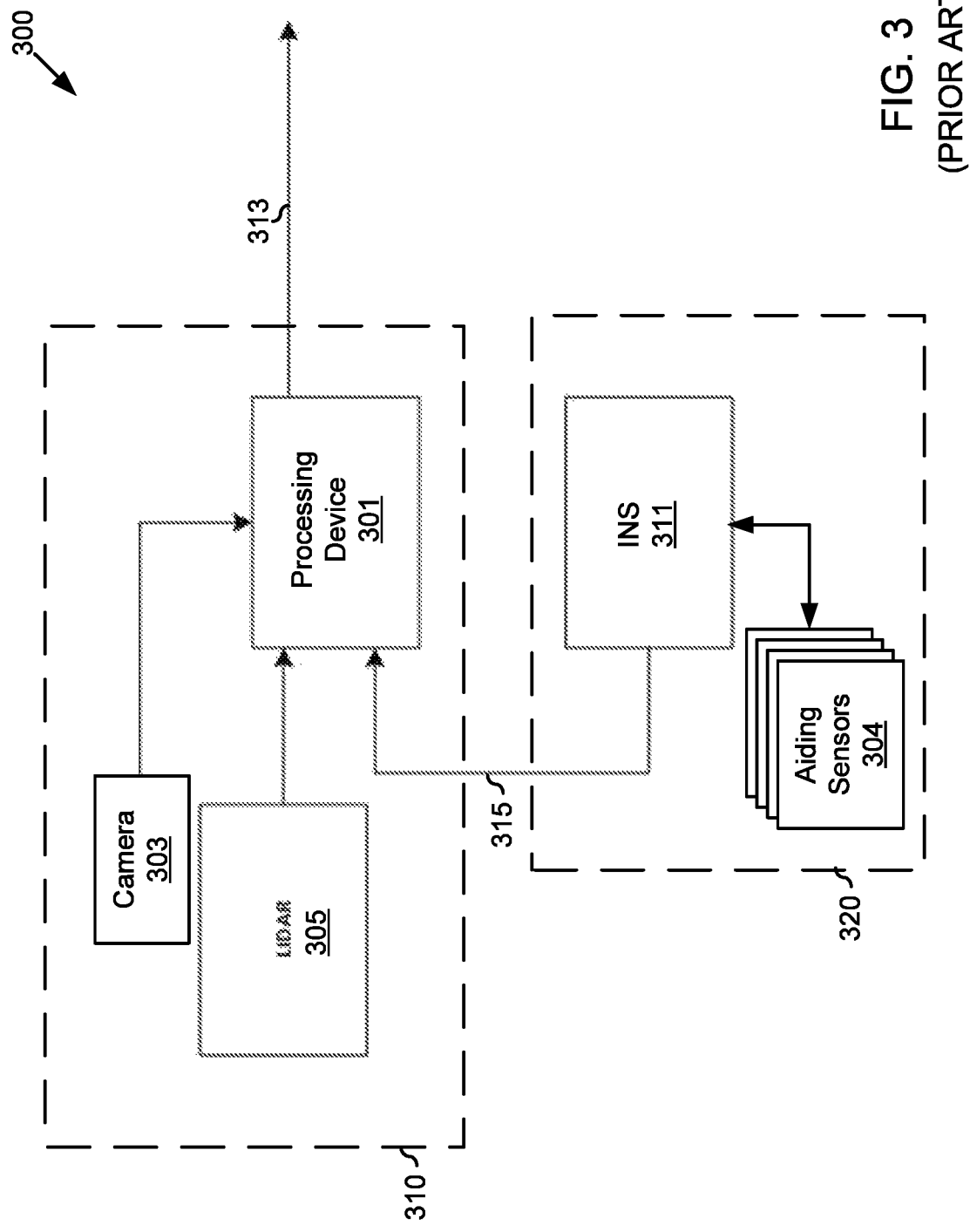
FIG. 3 is a block diagram illustrating a conventional navigation system incorporating an inertial navigation system according to an aspect of the present disclosure.

FIG. 3 is a block diagram illustrating a conventional navigation system 300 having multiple components. For example, the navigation system 300 may include an image sensor based component 310 and an inertial navigation system (INS) based component 320. The image sensor based component 310 may function in a similar manner to the navigation system 100 described above in FIG. 1. As illustrated, the navigation system 300 may include imaging sensors, such as a camera 303, a lidar 305, or other types of imaging sensors. Also, the image sensor based component 310 may include a processing device 301 that produces a navigation output 313. The processing device 301 functions with the camera 303 and the lidar 305 to perform visual and lidar odometry in a similar manner to that described above with respect to the camera 103, the lidar 105, and the processing device 101 in FIG. 1. Also, the image sensor based component 310 may receive inertial measurements from INS based component 320. Accordingly, the INS based component 320 may include an INS 311. Moreover, the INS based component 320 may include one or more aiding sensors 304.

In certain implementations, the navigation system 300 may also include an INS 311. As illustrated, the INS 311 may be a computational device that performs inertial measurements and calculates navigation parameters without the need for external references. For example, the INS 311 may include a computational device, motion sensors, and rotation sensors to calculate the position, the orientation, and the velocity of a moving object using dead reckoning. The INS 311 may provide the navigation parameters to the processing device 301 for fusing with the odometry measurements provided by the imaging sensors (camera 303 and lidar 305).

To provide the navigation parameters, the INS 311 may track the position and orientation of an object relative to a known starting point, orientation, and velocity. The INS 311 may further include an IMU that provides inertial measurements in a similar manner to the IMU 209 described above with respect to FIG. 2. A computational device within the INS 311 may process the signals provided by the IMU 209 to track the position and orientation of an object. As illustrated the INS 311 may provide the navigation parameters that result from the computations to the processing device 301 through an interface 315 on the INS 311. The navigation parameters provided through the interface 315 from the INS 311 to the processing device 301 may include an earth referenced velocity, an earth referenced position, an earth referenced acceleration, a body to earth angular position, a body to earth angular velocity, a body linear acceleration, a body angular velocity, and the like. The processing device 301 may use the provided navigation parameters to calculate the navigation output 313, which is similar to the navigation output 113 described above in FIG. 1.

A problem inherent in inertial navigation systems, such as the INS 311, is that the performed calculations are subject to integration drift. For example, small errors in the measurement of acceleration and angular velocity may be integrated into progressively larger errors in velocity, which are compounded into still greater errors in position. Since new position estimates are calculated from previously calculated position estimates and the measured acceleration and angular velocity, the errors accumulate in proportion to the time since the initial position was used as an input. Accordingly, the INS 311 may include other aiding sensors 304 to bound the errors caused by integration drift.

In certain embodiments, the aiding sensors 304 may include a magnetometer. The magnetometer may provide a measure of magnetic heading. When combined with a magnetic declination map, the magnetic heading measurement may be used to estimate a true heading. The INS 311 may use the true heading estimate to initialize heading for the IMU and as an aiding source during operation. Additionally, the aiding sensors 304 may include a barometric altimeter that provides an altitude and altitude change measurement. The INS 311 may use measurements produced by the barometric altimeter to stabilize a vertical channel measured by the INS 311. Also, the aiding sensors 304 may include a wheel encoder as an aiding source to acquire quadrature encoder measurements from wheels and/or steering wheels when the navigation system is associated with a vehicle.

In further embodiments, the aiding sensors 304 may include a RADAR that transmits a radio signal that is reflected off the environment to acquire range and/or range rate measurements. Moreover, the aiding sensors 304 may include a Sonar that transmits an acoustic signal that is reflected off the environment to acquire range and/or range rate measurements. Also, the aiding sensors 304 may include a transceiver used for radio navigation, where a radio signal is exchanged by two transceivers to measure range and/or range rate to a radio transceiver located at a different location from the navigation system. Additionally, the aiding sensors 304 may include ultrawide band ranging radios and acoustic navigation to measure range and/or range rate. Further, the aiding sensors 304 may include an airspeed sensor to measure the airspeed, angle of attack, and sideslip of an aircraft. The airspeed sensor may be used as an aiding sensor when the velocity of an airmass can be estimated.

In certain embodiments, the aiding sensors 304 may include a GNSS receiver, where the GNSS receiver provides pseudorange measurements from four or more satellites along with their positions, facilitating the calculation of the position of the navigation system. The INS 311 may use the GNSS position to bound the integration drift. The use of aiding sensors for an INS 311 that provides navigational information to the processing device 301 may provide several advantages. Some of the advantages provided by the INS 311 include that the processing device in the INS 311 performs some processing of inertial measurements, GNSS pseudoranges, and other measurements from aiding sources, thus freeing up the processing device 301 to dedicate more resources to the computationally intensive lidar and visual odometry computations. Also, the INS 311 may provide a navigation solution that can be used for redundancy and quality checks against the navigation solutions calculated using the lidar and visual odometry.

However, the use of the INS 311 may present some disadvantages. For example, when the navigation system 300 passes through a GNSS denied environment or experiences a GNSS receiver outage, the error growth in the measurements presented by the INS 311 may be uncontrolled. Accordingly, the navigation parameter 315 provided by the INS 311 may be inaccurate and be unusable by the processing device 301 when registering the odometry measurements to a map coordinate system.

Figure 4:
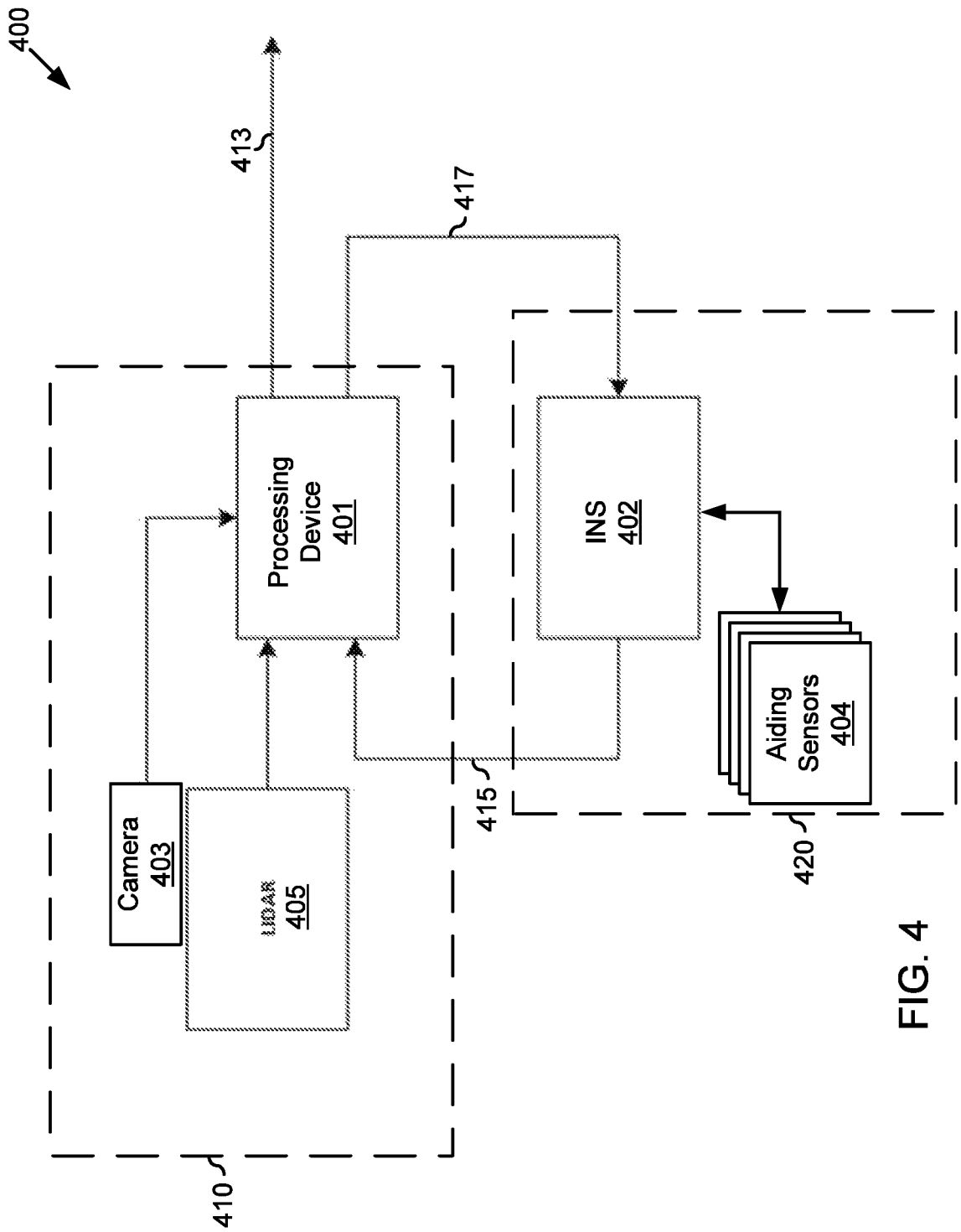
FIG. 4 is a block diagram illustrating a navigation system that provides feedback to an inertial navigation system according to an aspect of the present disclosure.

FIG. 4 is a block diagram illustrating a navigation system 400 that includes an image sensor based component 410 and an INS based component 420. The image sensor based component 410 and the INS based component 420 may function in similar manner as to the image sensor based component 310 and the INS based component 320 in FIG. 3. However, the INS 402 in the INS based complement 420 may have an input interface 417 for receiving feedback from a processing device 401 in the image sensor based component 410, where the processing device 401 may be associated with the calculation of visual and lidar odometry, where the calculation of the visual and lidar odometry is substantially described above. As illustrated, the processing device 401, camera 403, lidar 405, and INS 402 may function substantially as described above. Accordingly, the INS 402 may include a computational device that calculates navigation parameters from an IMU and other aiding sources 404 and provides the navigation parameters through an interface 415 to the processing unit 401. Typically, the processing device 401 performs more computationally intensive tasks than the computational device on the INS 402 and the processing device 401 and computational device of the INS 402 may have processing capabilities commensurate with the computational intensity of the performed tasks. However, any processor that can capably perform the requested computations may function as the processing unit 401 or the computational device on the INS 402.

In some embodiments, in addition to including an interface 415 for providing navigational parameters to the processing device 401, the INS 402 may also include an input interface 417 for receiving navigation parameters from the processing device 401. Accordingly, the INS 402 may provide navigation parameters through the interface 415 to the processing device 401 that include earth referenced position, earth referenced velocity, earth referenced acceleration, body to earth angular position, body to earth angular velocity, body linear acceleration, and body angular velocity, and the like. Also, the processing device 401 may provide navigation parameters such as linear position in map coordinates, angular position in map coordinates, change in position in body coordinates, change in attitude in body coordinates, and the like.

In certain embodiments, the INS 402 may function as an aiding source for the processing device 401 through the interface 415. For example, the INS may provide navigation parameters through the interface 415, where the processing unit 401 is coupled to the interface 415 to accept the provided navigation parameters as inputs. The processing device 401 may use the received navigation parameters when performing various functions. For example, the processing device 401 may execute a map building function that uses the received navigation parameters when performing odometry and registering new point clouds or image data acquired from the lidar 405 and/or the camera 403. Also, the map building function may use the received navigation parameters to register point clouds or image data to a georeferenced map. The processing unit 401 may perform other functions to provide the navigation output 413, where the navigation output 413 is substantially described above with respect to the navigation output 113, 213, and 313.

In alternative embodiments, the processing unit 401 may function as an aiding source for the INS 402 through the input interface 417. For example, the INS may receive the linear and angular position in map coordinates or changes in position and attitude in body coordinates. The INS may use the received data to bound the drift that may occur to the inertial measurements during operation. For example, when the object associated with the navigation system 400 passes through a GNSS obstructed environment, there is a high probability that the object is passing through a feature rich environment thus increasing the accuracy of the odometry measurements produced by the processing unit 401. Conversely, without the GNSS signals, without additional aiding sources, position and attitude errors in the navigation parameters produced by the INS 402 may increase. Accordingly, the processing unit 401 may provide odometry measurements to the INS 402 through the input interface 417, which the INS 402 may then use to reduce the error growth rate in the navigation parameters produced by the INS 402.

In some embodiments, to implement the input interface 417, the processing unit 401 may compute a change in linear and angular position over a time period. In some implementations, the time period may be a fixed interval but in other implementations, the time period between computations may be variable. The processing unit 401 may then communicate the calculated measurements to the INS 402 across the input interface 417 through a message that is understandable to the INS 402. When the INS 402 receives the message from the processing unit 401, the INS 402 may use the information within a Kalman filter in combination with other measurements to slow the development of errors in the inertial measurements.

In certain embodiments, during initialization of the system, a digital message may be defined for allowing a user or other system to pass sensor installation data through the input interface 417. Additionally, during operation, the input interface 417 may define messages for receiving information from other devices such as the processing unit 401. For example, the interface may provide for a message for receiving the following messages:

$r(t)_{M \to P}^M$, and $q(t)_P^M$.

The $r(t)_{M \to P}^M$ may refer to the position of the imaging sensor body frames with respect to a map frame at a particular time. The $q(t)_P^M$ may refer to an attitude of the imaging sensor body frames with respect to the map frame at a particular time.

In some embodiments, when the INS receives a message through the input interface 417, the computational device of the INS 402 may apply a time stamp to the message of the time of reception and place the message in a circular buffer. The INS 402 may retrieve two messages from the circular buffer which have not been processed yet and fall with a look back window. The contents of the message may be referred to as:

The past data valid at time $t_p = t_k - \Delta t$:

$r(t_p)^M$, and $q(t_p)_P^M$.

The current data valid at time $t_c = t_k$:

$r(t_c)^M$, and $q(t_c)_P^M$.

Additionally, the following variables may be defined:

$C(t)_P^M = f(q(t)_P^M)$: Rotation matrix which takes a vector from the body frame to the map frame.

$C(t)_M^P = (C(t)_P^M)^T$: Rotation matrix which takes a vector from the map frame to the body frame.

In additional embodiments, the angular position of the point cloud body frame to map frame $C_P^M$ may be assumed to be constant and not vary with time. Additionally, the measurement provided through the interface 417: $\overline{C_P^M} = C_P^M + \delta C_P^M$, may be an estimate of the angular position of the point cloud body frame to map frame. Algorithms executing within the INS 402 may assume that the estimate of the angular position is in error. The error may be calculated using the following equation:

$\delta C_P^M = -\{\mu^M + \eta^M\} C_P^M$:

The error in the measurement includes a time correlated bias and noise. Also, the position of the point cloud frame origin with respect to the map frame coordinatized in the map frame may be represented as $r_{M \to P}^M$. Additionally, the measurement provided through the interface 417 may be an estimate of the position of the point cloud frame in the map frame coordinatized in the map frame represented as follows: $\overline{r_{M \to P}^M}$. Further, the angular position of the body frame (P) of the imaging sensors to the body frame (B) of the INS 402 may be represented as: $C_P^B$ Moreover, the estimate of the angular position of the body frame of the imaging sensors to the body frame of the INS 402 may be represented as follows: $\widehat{C_P^B} = C_P^B + \delta C_P^B$. Also, misalignment errors of the imaging sensor reference frame relative to the INS body frame may be represented as: $\delta C_P^B = -\{\beta^B\} C_P^B$. Further, the error may be assumed constant in the INS body frame. Also, $C_B^L$:B to L;

$C_L^E$:L to E; and $C_B^E$:$C_L^E C_L^B$.

In certain embodiments, given the past and current position data defined above with the following:

$r(t_p)^M, C(t_p)_P^M, r(t_c)^M, C(t_c)_P^M$, the delta position measurement in the customer body frame is formed as follows:

$\Delta_r^P = C(t_c)_M^P r(t_c)^M - C(t_p)_M^P r(t_p)^M$.

To be used in the Kalman filter of the INS 402 it must be put into the ECEF frame as follows:

$y_{\Delta pos} = C_B^E C_P^B [\Delta r^P]$.

This measurement is linearized and presented to the INS Kalman filter.

In further embodiments, the delta attitude measurement may be the change in angular position of the body frame of the imaging sensors. The delta attitude measurement may be defined as follows:

$C_{P(t-\Delta t)}^{P(t)} = C_M^{P(t)} C_{P(t-\Delta t)}^M = (C(t_c)_P^M)^T C(t_p)_P^M$.

To be used in the Kalman filter of the INS 402, the delta attitude measurements may be put into the ECEF frame:

$y_{\Delta Att} = C_B^E C_P^B C_{P(t-\Delta t)}^{P(t)} (C_P^B)^T (C_B^E)^T = C_M^{P(t)} C_{P(t-\Delta t)}^M = (C(t_c)_P^M)^T C(t_p)_P^M$ This measurement may be linearized and presented to the Kalman filter of the INS 402.

Figure 5:
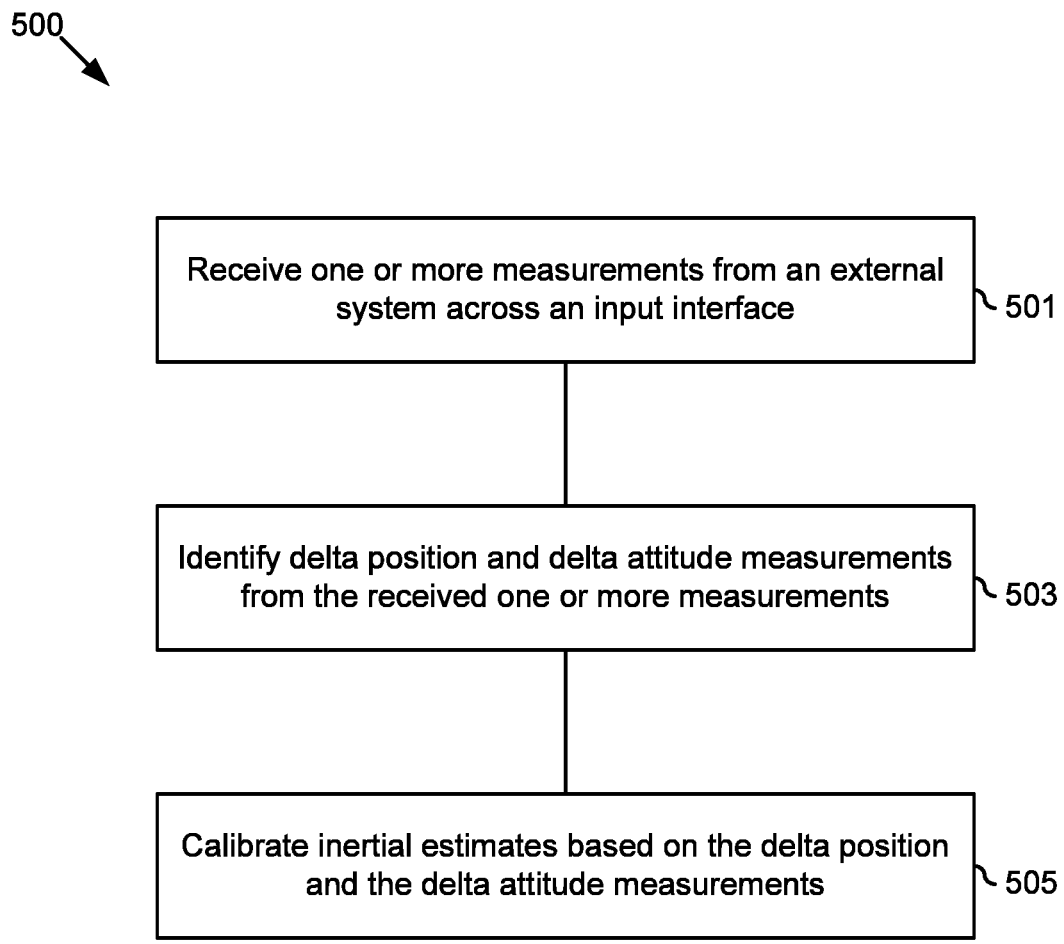
FIG. 5 is a flowchart diagram illustrating an exemplary method for providing feedback to an inertial navigation system.

FIG. 5 is a flowchart diagram illustrating an exemplary method 500 for providing feedback to an inertial navigation system through an input interface. In certain embodiments, method 500 proceeds at 501, where one or more measurements are received from an external system across an input interface. Additionally, method 500 proceeds at 503, where delta position and delta attitude measurements are identified from the received one or more measurements. As used herein, the delta position and delta attitude may refer to changes in position and attitude over a period of time. Method 500 then proceeds at 505, where inertial estimates are calibrated based on the delta position and the delta attitude measurements.

EXAMPLE EMBODIMENTS

Example 1 includes a device comprising: an inertial navigation system, the inertial navigation system comprising: one or more inertial sensors; an input interface for receiving measurements, wherein the measurements comprise at least one of: delta attitude and/or delta position measurements from an external system; and position and attitude information in an arbitrary map frame; and a computation device that is configured to calibrate the errors from the one or more inertial sensors using the received measurements.

Example 2 includes the device of Example 1, wherein the inertial navigation system receives the delta attitude and/or delta position measurements and the position and attitude information in a defined message format.

Example 3 includes the device of any of Examples 1-2, wherein the inertial navigation system applies a time stamp to the received measurements.

Example 4 includes the device of any of Examples 1-3, wherein the inertial navigation system stores the received measurements in a circular buffer.

Example 5 includes the device of any of Examples 1-4, wherein the inertial navigation system further receives navigation information from a plurality of aiding sources, wherein the computation device uses a Kalman filter to combine the received navigation information with the received measurements.

Example 6 includes the device of any of Examples 1-5, wherein the inertial navigation system receives an initial configuration through the input interface.

Example 7 includes the device of any of Examples 1-6, wherein the computation device calibrates the errors using the received measurements when the computation device determines that the inertial navigation system is in a GNSS denied environment.

Example 8 includes a method comprising: receiving one or more measurements from an external system across an input interface, wherein the one or more measurements are related to the position and attitude of the external system within a local environment; identifying delta position and delta attitude measurements from the received one or more measurements; and calibrating inertial estimates based on the delta position and the delta attitude measurements.

Example 9 includes the method of Example 8, wherein receiving the one or more measurements further comprises receiving the one or more measurements in a defined message format.

Example 10 includes the method of any of Examples 8-9, further comprising applying a time stamp to the received one or more measurements.

Example 11 includes the method of any of Examples 8-10, further comprising storing the received one or more measurements in a circular buffer.

Example 12 includes the method of any of Examples 8-11, further comprising: receiving navigation information from a plurality of aiding sources; and using a Kalman filter to combine the received navigation information with the received one or more measurements.

Example 13 includes the method of any of Examples 9-12, further comprising receiving an initial configuration through the input interface.

Example 14 includes the method of any of Examples 8-13, further comprising: determining that reliable GNSS measurements are unavailable; and calibrating the inertial estimates based on the determination.

Example 15 includes a system comprising: an inertial navigation system coupled to an external device, the inertial navigation system comprising: one or more inertial sensors configured to provide inertial measurements of motion experienced by the system; an input interface configured to receive one or more measurements through one or more messages defined for communications with the inertial navigation system from the external device; a computation device configured to acquire delta position measurements and delta attitude measurements for the system from the one or more measurements, wherein the processing unit calibrates the inertial measurements based on the delta position measurements and the delta attitude measurements.

Example 16 includes the system of Example 15, wherein the inertial navigation system further receives navigation information from a plurality of aiding sources, wherein the computation device uses a Kalman filter to combine the received navigation information with the received one or more measurements.

Example 17 includes the system of any of Examples 15-16, wherein the inertial navigation system applies a time stamp to the one or more measurements.

Example 18 includes the system of any of Examples 15-17, wherein the inertial navigation system stores the one or more measurements in a circular buffer.

Example 19 includes the system of any of Examples 15-18, wherein the inertial navigation system receives an initial configuration through the input interface.

Example 20 includes the system of any of Examples 15-19, wherein the processing unit calibrates the errors using the received measurements when the computation device determines that the inertial navigation system is in a GNSS denied environment.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A device comprising:
an inertial navigation system, the inertial navigation system comprising:
one or more inertial sensors configured to produce inertial measurements of motion for a vehicle;
an output interface for providing navigation parameters based on the inertial measurement to an external processing device on the vehicle that fuses the navigation parameters from the inertial navigation system with information from external sensors coupled to the external processing device; and an input interface for receiving measurements from the external processing device configured to calculate measurements, wherein the measurements comprise at least one of:
  delta attitude and/or delta position measurements from an external system; and
  position and attitude information in an arbitrary map frame; and
a computation device separate from the external processing device that is configured to calibrate the inertial measurements from the one or more inertial sensors using the received measurements, wherein the vehicle uses the calibrated inertial measurements to calculate a navigation solution that estimates the state of the vehicle while traveling.

2. The device of claim 1, wherein the inertial navigation system receives the delta attitude and/or delta position measurements and the position and attitude information in a defined message format.

3. The device of claim 1, wherein the inertial navigation system applies a time stamp to the received measurements.

4. The device of claim 1, wherein the inertial navigation system stores the received measurements in a circular buffer.

5. The device of claim 1, wherein the inertial navigation system further receives navigation information from a plurality of aiding sources, wherein the computation device uses a Kalman filter to combine the received navigation information with the received measurements.

6. The device of claim 1, wherein the inertial navigation system receives an initial configuration through the input interface.

7. The device of claim 1, wherein the computation device calibrates the errors using the received measurements when the computation device determines that the inertial navigation system is in a GNSS denied environment.

8. A method comprising:
  receiving inertial measurements of motion for a vehicle from one or more inertial sensors within an inertial navigation system on the vehicle;
  calculating inertial estimates based on the inertial measurements;
  providing navigation parameters based on the inertial measurements to an external system on the vehicle and separate from the inertial navigation system through an output interface of the inertial navigation system;
  receiving one or more measurements from the external system across an input interface, wherein the one or more measurements are related to position and attitude of the vehicle within a local environment;
  identifying delta position and delta attitude measurements from the received one or more measurements; and
  calibrating the inertial estimates based on the delta position and the delta attitude measurements;
  using the calibrated inertial estimates to calculate a navigation solution that estimates the state of the vehicle while traveling.

9. The method of claim 8, wherein receiving the one or more measurements further comprises receiving the one or more measurements in a defined message format.

10. The method of claim 9, further comprising receiving an initial configuration through the input interface.

11. The method of claim 8, further comprising applying a time stamp to the received one or more measurements.

12. The method of claim 8, further comprising storing the received one or more measurements in a circular buffer.

13. The method of claim 8, further comprising:
  receiving navigation information from a plurality of aiding sources; and
  using a Kalman filter to combine the received navigation information with the received one or more measurements.

14. The method of claim 8, further comprising:
  determining that reliable GNSS measurements are unavailable; and
  calibrating the inertial estimates based on the determination.

15. A system comprising:
a plurality of sources of navigation information, wherein the plurality of sources of navigation information for a vehicle comprises at least one inertial navigation system component mounted on the vehicle; and
a processing device on the vehicle configured to fuse the navigation information from the plurality of sources of navigation information to create a navigation output; and
wherein the at least one inertial navigation system component is coupled to the processing device, the inertial navigation system component comprising:
  one or more inertial sensors configured to provide inertial measurements of motion experienced by the vehicle;
  an output interface for providing navigation parameters based on the inertial measurements to the processing device, where the processing device receives the navigation parameters as part of the navigation information;
  an input interface configured to receive one or more measurements through one or more messages defined for communications with the inertial navigation system from the processing device; and
  a computation device configured to acquire delta position measurements and delta attitude measurements for the vehicle from the one or more measurements, wherein the computation device calibrates the inertial measurements based on the delta position measurements and the delta attitude measurement;
wherein the processing device uses the calibrated inertial measurements to provide the navigation output estimating the state of the vehicle for use by the vehicle in motion.

16. The system of claim 15, wherein the inertial navigation system further receives navigation information from a plurality of aiding sources, wherein the computation device uses a Kalman filter to combine the received navigation information with the received one or more measurements.

17. The system of claim 15, wherein the inertial navigation system applies a time stamp to the one or more measurements.

18. The system of claim 15, wherein the inertial navigation system stores the one or more measurements in a circular buffer.

19. The system of claim 15, wherein the inertial navigation system receives an initial configuration through the input interface.

20. The system of claim 15, wherein the computation device calibrates the errors using the received measurements when the computation device determines that the inertial navigation system is in a GNSS denied environment.

* * * * *